(12) United States Patent
Pickering et al.

(10) Patent No.: US 8,634,538 B2
(45) Date of Patent: *Jan. 21, 2014

(54) METHOD AND APPARATUS FOR HANDLING A TELEPHONE CALL

(71) Applicant: NewVoiceMedia Limited, Basingstoke (GB)

(72) Inventors: Richard Pickering, Torquay (GB); Ashley Unitt, Whitchurch (GB)

(73) Assignee: NewVoiceMedia Limited, Basing view (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,758

(22) Filed: Feb. 13, 2013

(65) Prior Publication Data

US 2013/0136249 A1 May 30, 2013

Related U.S. Application Data

(63) Continuation-in-part of application No. 13/370,284, filed on Feb. 9, 2012, which is a continuation of application No. 11/942,279, filed on Nov. 19, 2007, now Pat. No. 8,139,753.

(60) Provisional application No. 60/860,450, filed on Nov. 20, 2006.

(51) Int. Cl.
*H04M 3/00* (2006.01)
*H04M 5/00* (2006.01)

(52) U.S. Cl.
USPC .............. 379/265.02; 379/88.19; 379/110.01; 379/218.01; 379/265.14

(58) Field of Classification Search
USPC ............. 379/265.01, 265.02, 265.09, 265.14, 379/218.01
See application file for complete search history.

(56) References Cited

U.S. PATENT DOCUMENTS

| | | | |
|---|---|---|---|
| 6,373,836 B1 | 4/2002 | Deryugin et al. | |
| 2003/0103617 A1* | 6/2003 | Brown et al. | ............. 379/265.02 |
| 2003/0161456 A1* | 8/2003 | Brown et al. | .................. 379/188 |
| 2003/0206622 A1* | 11/2003 | Foster | ....................... 379/265.09 |
| 2005/0128961 A1* | 6/2005 | Miloslavsky et al. | ......... 370/270 |
| 2006/0153173 A1* | 7/2006 | Beck et al. | ..................... 370/352 |
| 2013/0022179 A1* | 1/2013 | Anisimov et al. | ........... 379/88.01 |

* cited by examiner

*Primary Examiner* — Simon Sing
*Assistant Examiner* — Simon King
(74) *Attorney, Agent, or Firm* — Galvin Patent Law LLC; Brian R. Galvin

(57) ABSTRACT

A system for handling a telephone call within a telephone network, comprising a multi-tenanted CTI server within a telecommunications network adapted to receive telephone calls on behalf of a plurality of outlets, wherein the CTI server is adapted for queuing an incoming call in the network when no agent is available and is further adapted to forward an incoming call to an agent when the agent becomes available. The CTI server is configured to use an indicia received with the received call to identify the caller and to retrieve a profile from a cloud-based CRM system of the caller by matching the indicia to a previously-stored indicia in a call history database, the profile comprising at least a plurality of previous orders processed by an outlet on behalf of the caller, the profile being used to provide priority call handling for certain callers.

9 Claims, 7 Drawing Sheets

METHOD AND APPARATUS FOR HANDLING A TELEPHONE CALL

RELATED APPLICATIONS

This application is a continuation-in-part of U.S. patent application Ser. No. 13/370,284, entitled "Method and Apparatus for Handling a Telephone Call", filed on Feb. 11, 2012, which is a continuation of U.S. patent application Ser. No. 11/942,279, entitled "Method and Apparatus for Handling a Telephone Call", filed on Nov. 19, 2007, which claims priority under 35 U.S.C. §119 to U.S. Provisional Patent Application No. 60/860,450, filed Nov. 20, 2006, also entitled "Method And Apparatus For Handling A Telephone Call", the entire specification of which is incorporated herein by reference.

BACKGROUND

1. Field of the Invention

The invention relates to a method and apparatus for handling a telephone call, especially for use in the context of a fast food delivery service and other similar businesses.

2. Background of the Invention

It is very common for customers to order a product over the telephone. One particular industry where this is a very widespread activity is for home delivery of fast food, for example pizzas. The characteristics of this business place significant constraints on the handling of customer calls. Thus frequently there is no pre-existing arrangement (e.g. a contract) that ties the customer to any given pizza delivery outlet. Rather, the customer will telephone one establishment, but if their call is not handled swiftly, they may then telephone another rival establishment. If they receive good service from this rival establishment, they may call the rival first next time they need a pizza. In other words, there is high customer mobility between competing businesses, and accordingly customer service standards have to be very high to retain customers. This particular applies to the handling of incoming telephone calls, which represent the first point of contact with the customer (when it is easiest for the customer to retract and go elsewhere). Existing systems generally do not provide a mechanism to reward and retain loyal customers.

Another problem is that the call rate into pizza delivery outlets may be highly bunched. For example, if there is a popular event on television, there may be a sharp peak in calls immediately before or after the event, or during an interval (e.g. an advertising break). These variations in incoming call rate exacerbate the problem of providing a good telephone service to all customers.

A further consideration is that most pizza delivery establishments are small businesses. They cannot afford large-scale call handling facilities, either in terms of the infra structure, or the staff to run them.

It is also common for such pizza establishments to be franchise operations. The franchisor would like customers to experience a common customer interface irrespective of which franchisee they contact in order to build brand value for the franchise, but this is difficult with multiple franchisees each operating a highly local service. There is also a concern amongst franchisors that some franchisees might hide part of their business from the franchisor (in order to avoid royalty payments).

Accordingly, there are significant challenges in providing good telephone service for pizza delivery outlets and other such businesses.

SUMMARY OF THE INVENTION

One embodiment of the invention provides a method of handling a telephone call. The method includes providing a multi-tenanted computer-telephony integration (CTI) server. The different tenants correspond to various enterprises. The CTI server is located outside the customer premises for the various enterprises. The method further includes receiving a call directed to one of the outlets and using CLI for the call by the CTI server to identify the calling party, and a customer profile for the calling party is retrieved party from a cloud-based CRM system located remotely from the CTI server and from the plurality of contact centers. The customer profile is based on previous orders. The method further includes queuing the call within the network if it is determined that the outlet is unable to currently service the call, and forwarding the call to the outlet to process the call. The CTI server uses the customer profile for providing priority call handling treatment for loyal customers. Such a method may be used in a fast food delivery business such as pizza ordering or in any other appropriate business.

In one embodiment, the customer profile is used to provide a marketing message dependent on the customer profile. The marketing message may also be dependent on real-time information from an external source, for example weather data, current product availability, etc. The marketing message may also be dependent on the time spent in the queue. In one embodiment, the outlet is informed of the marketing message heard by the caller. For example, this enables the outlet to hear if the caller has heard about a particular promotion.

In one embodiment, the priority call handling treatment includes accelerating the progress of the call through a queue of calls. Therefore customers who are loyal have their calls answered relatively early.

In one embodiment, the CTI server bridges the call with a call placed from the CTI server to an outlet. In other words, there is a first call arriving from the caller at the CTI server, and a second call from the CTI server to the pizza outlet (or other call handling facility). The first and second calls are bridged so that the existence of two separate calls is transparent to the caller. However, because the CTI server retains a presence in the two calls, it can collect call statistics, record the call, etc. The call recording may be performed by the CTI server itself or some device under the control of the CTI server, such as an IVR.

In one embodiment, automated order status is provided to repeat callers (since they are frequently calling about order status). This frees up human agents to take calls for new orders. In one embodiment, the method further comprises maintaining a call history database, and comparing the CLI with the call history database to identify a repeat caller.

In one embodiment, the method further comprises maintaining a local copy at the CTI server of customer profile data and accessing remote order data and/or product availability data for handling the call. Having the local copy at the CTI server of the customer profile data allows the CTI server to generally have a quicker response time for call processing. However order data and/or product availability data are generally stored at the various outlets themselves, since these change more frequently than customer profile data (and so would be harder to mirror in the network).

In one embodiment, the CTI server collects aggregate statistics for calls to all the various outlets. These aggregated statistics can be made available for management purposes, for example to a franchisor, where the various outlets are franchise operations of the franchisor.

In a further embodiment, customer information is stored in a remote or cloud-based customer relationship management (CRM) server, such as those provided by such services as Salesforce.com™, and such a database may be used as the sole copy of customer information or as a source for updates to a local copy, as new information is added to the cloud.

Other embodiments of the invention provide a computer program and apparatus for implementing a method such as described above. The computer program may be provided as machine executable instructions on a computer readable medium.

BRIEF DESCRIPTION OF THE DRAWINGS

Various embodiments of the invention will now be described in detail by way of example only with reference to the following drawings.

DETAILED DESCRIPTION

Figure 1:
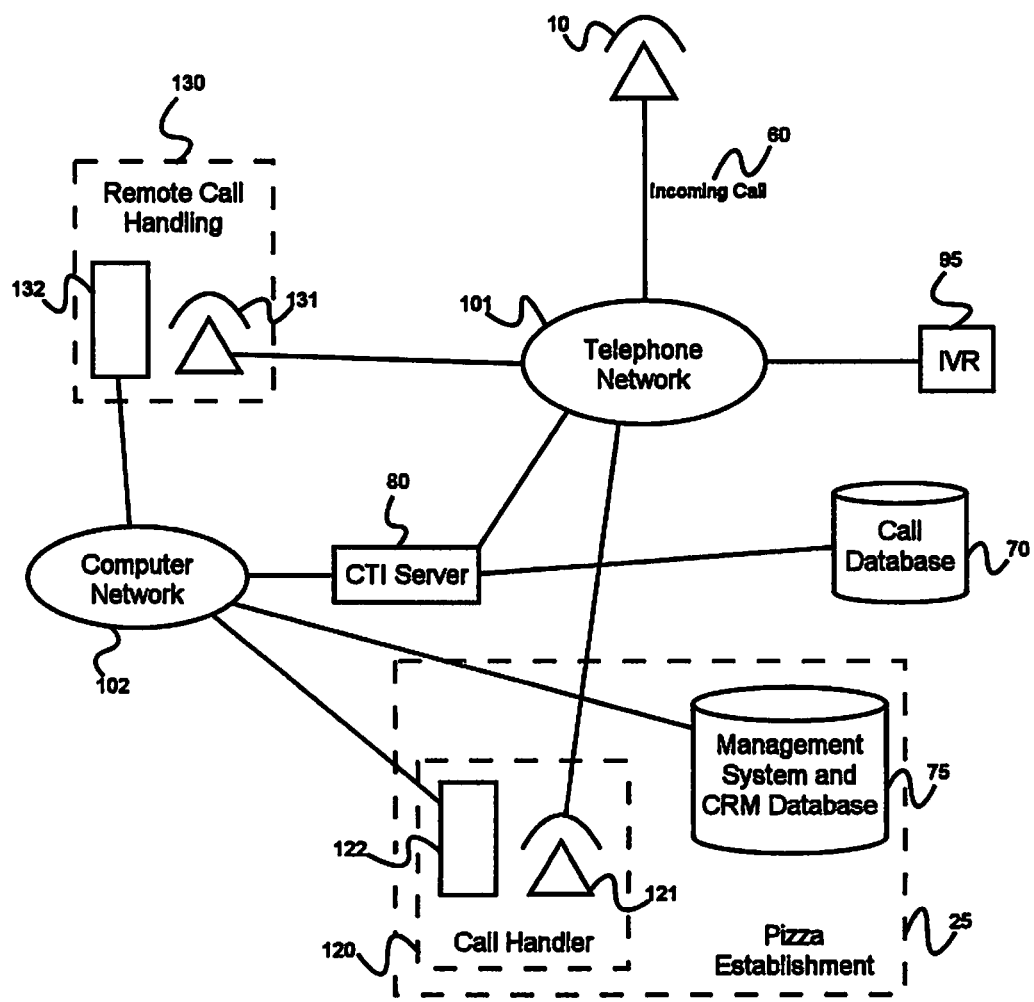
FIG. 1 is a schematic diagram of a CTI system in accordance with one embodiment of the invention.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Furthermore, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of the embodiments of the present invention in which for example functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Software/hardware hybrid implementation(s) of at least some of the embodiment(s) disclosed herein may be implemented on a programmable machine selectively activated or reconfigured by a computer program stored in memory. Such network devices may have multiple network interfaces that may be configured or designed to utilize different types of network communication protocols. A general architecture for some of these machines may appear from the descriptions disclosed herein. According to specific embodiments, at least some of the features and/or functionalities of the various embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, music player, or any other suitable electronic device, router, switch, or the like, or any combination thereof. In at least some embodiments, at least some of the features and/or functionalities of the various embodiments disclosed herein may be implemented in one or more virtualized computing environments (e.g., network computing clouds, or the like).

Figure 3:
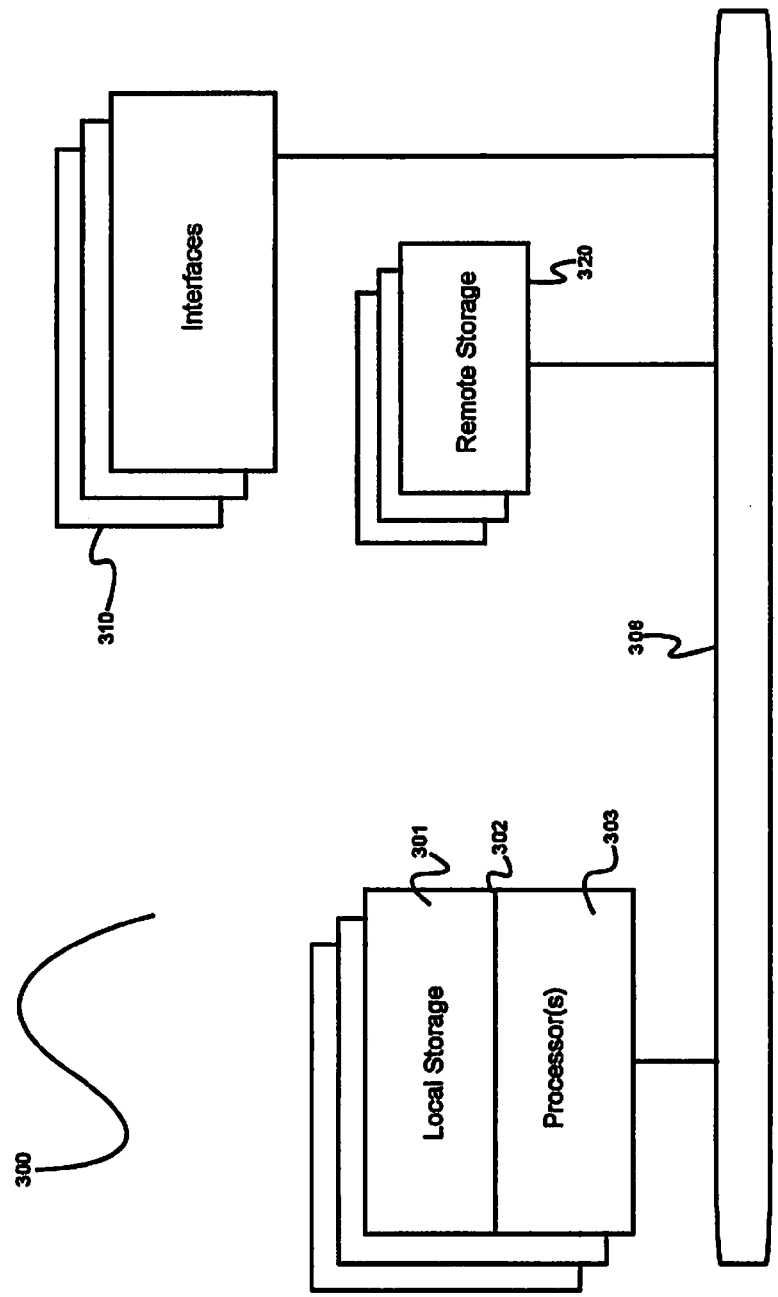
FIG. 3 is a block diagram illustrating an exemplary hardware architecture of a computing device used in an embodiment of the invention.

Referring now to FIG. 3, there is shown a block diagram depicting a computing device 300 suitable for implementing at least a portion of the features and/or functionalities disclosed herein. Computing device 300 may be, for example, an end-user computer system, network server or server system, mobile computing device (e.g., personal digital assistant, mobile phone, smartphone, laptop, tablet computer, or the like), consumer electronic device, music player, or any other suitable electronic device, or any combination or portion thereof. Computing device 300 may be adapted to communicate with other computing devices, such as clients and/or servers, over a communications network such as the Internet, using known protocols for such communication, whether wireless or wired.

In one embodiment, computing device 300 includes central processing unit (CPU) 302, interfaces 310, and a bus 306 (such as a peripheral component interconnect (PCI) bus). When acting under the control of appropriate software or firmware, CPU 302 may be responsible for implementing specific functions associated with the functions of a specifically configured computing device or machine. For example, in at least one embodiment, a user's [[[personal digital assistant (PDA) may be configured or designed to function as an intelligent automated assistant]]] system utilizing CPU 302, memory 301, 320, and interface(s) 310. In at least one embodiment, CPU 302 may be caused to perform one or more of the different types of functions and/or operations under the control of software modules/components, which for example, may include an operating system and any appropriate applications software, drivers, and the like.

CPU 302 may include one or more processor(s) 303 such as, for example, a processor from one of the Intel, ARM, Qualcomm, and AMD families of microprocessors. In some embodiments, processor(s) 303 may include specially designed hardware (e.g., application-specific integrated circuits (ASICs), electrically erasable programmable read-only memories (EEPROMs), field-programmable gate arrays (FPGAs), and the like) for controlling operations of computing device 300. In a specific embodiment, a memory 301 (such as non-volatile random access memory (RAM) and/or read-only memory (ROM)) also forms part of CPU 302. However, there are many different ways in which memory may be coupled to the system. Memory block 301 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 310 are provided as interface cards (sometimes referred to as "line cards"). Generally, they control the sending and receiving of data packets over a computing network and sometimes support other peripherals used with computing device 300. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 310 may include ports appropriate for communication with appropriate media. In some cases, they may also include an independent processor and, in some in stances, volatile and/or non-volatile memory (e.g., RAM).

Although the system shown in FIG. 3 illustrates one specific architecture for a computing device 300 for implementing the techniques of the invention(s) described herein, it is by no means the only device architecture on which at least a portion of the features and techniques described herein may be implemented. For example, architectures having one or any number of processors 303 can be used, and such processors 303 can be present in a single device or distributed among any number of devices. In one embodiment, a single processor 303 handles communications as well as routing computations. In various embodiments, different types of features and/or functionalities may be implemented in a system according to the invention that includes a client device (such as a personal digital assistant or smartphone running client software) and server system(s) (such as a server system described in more detail below).

Regardless of network device configuration, the system of the present invention may employ one or more memories or memory modules (such as, for example, memory block 320) configured to store data, program instructions for the general-purpose network operations and/or other information relating to the functionality of the embodiments described herein. The program instructions may control the operation of an operating system and/or one or more applications, for example. The memory or memories may also be configured to store data structures, domain and topic information, social network graph information, user actions information, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both machine code, such as produced by a compiler, and files containing higher level code that may be executed by the computer using an interpreter.

Figure 4:
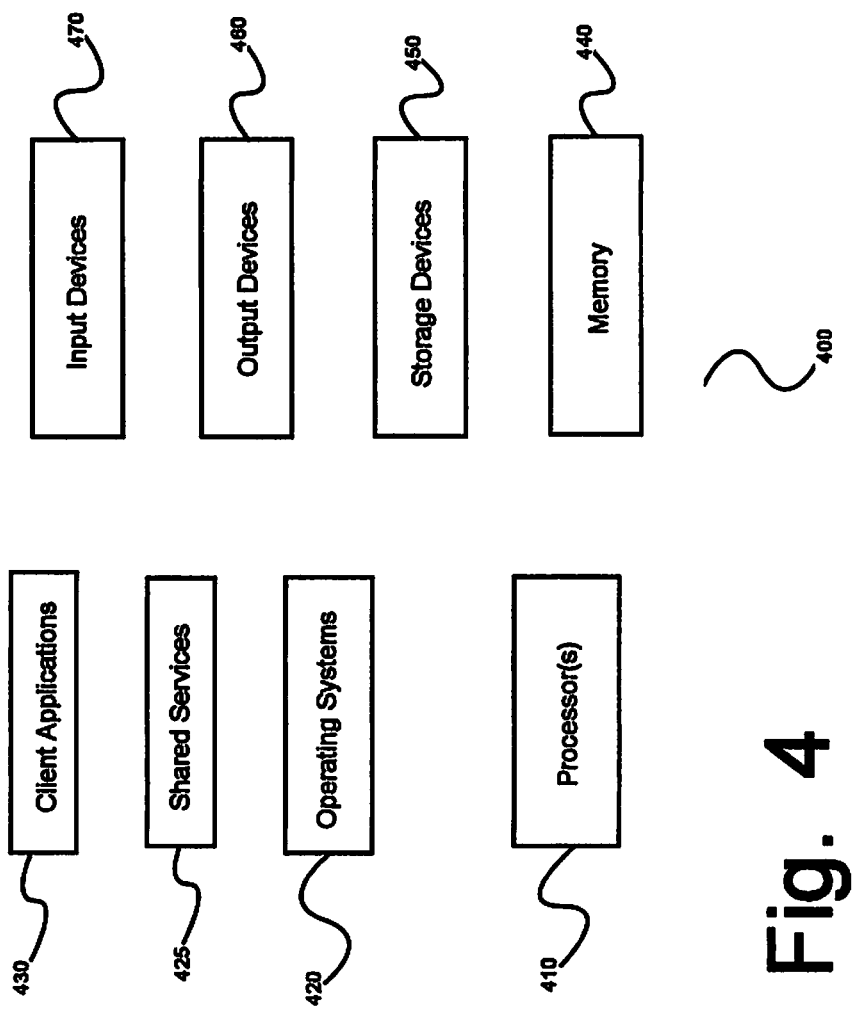
FIG. 4 is a block diagram illustrating an exemplary logical architecture for a client device, according to an embodiment of the invention.

In some embodiment, systems used according to the present invention may be implemented on a standalone computing system. Referring now to FIG. 4, there is shown a block diagram depicting an architecture for implementing one or more embodiments or components thereof on a standalone computing system. Computing device 300 includes processor(s) 303 that run software for implementing for example an email or other document management client application 400. Input device 412 can be of any type suitable for receiving user input, including for example a keyboard, touchscreen, microphone (for example, for voice input), mouse, touchpad, trackball, five-way switch, joy stick, and/or any combination thereof. Output device 411 can be a screen, speaker, printer, and/or any combination thereof. Memory 410 can be random-access memory having a structure and architecture as are known in the art, for use by processor(s) 303 for example to run software. Storage device 411 can be any magnetic, optical, and/or electrical storage device for storage of data in digital form; examples include flash memory, magnetic hard drive, CD-ROM, and/or the like.

Figure 5:
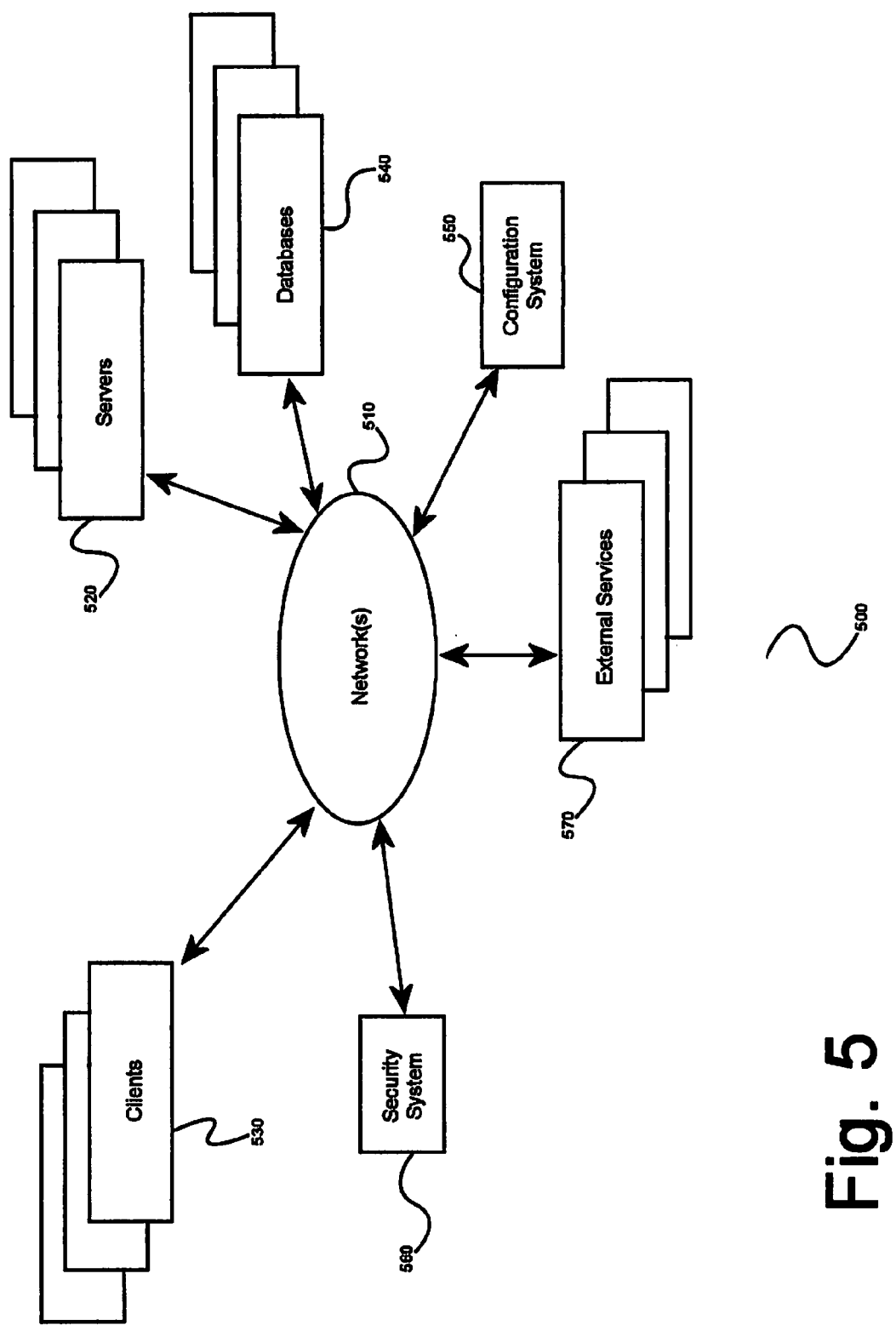
FIG. 5 is a block diagram showing an exemplary architectural arrangement of clients, servers, and external services, according to an embodiment of the invention.

In some embodiments, the system of the present invention is implemented on a distributed computing network, such as one having any number of clients and/or servers. Referring now to FIG. 5, there is shown a block diagram depicting an architecture for implementing at least a portion of an intelligent automated assistant on a distributed computing network, according to at least one embodiment.

The arrangement shown in FIG. 5, any number of clients 510 are provided; each client 510 may run software for implementing client-side portions of the present invention. In addition, any number of servers 520 can be provided for handling requests received from clients 510. Clients 510 and servers 520 can communicate with one another via electronic network 500, which may be in various embodiments any of the Internet, a wide area network, a mobile telephony network, a wireless network (such as WiFi, Wimax, and so forth), or a local area network (or indeed any network topology known in the art; the invention does not prefer any one network topology over any others). Network 500 may be implemented using any known network protocols, including for example wired and/or wireless protocols.

In addition, in some embodiment, servers 520 can call external services 530 when needed to obtain additional information, to refer to additional data concerning a particular document or message, or to access for example curated data sources (for example, Wolfram Alpha™) in order to assist in building rich ontologies. Communications with external services 530 can take place, for example, via network 500. In various embodiments, external services 530 include web-enabled services and/or functionality related to or installed on the hardware device itself. For example, in an embodiment where email client 400 is implemented on a smartphone or other electronic device, client 400 can obtain information stored in an email archive or a document store in the cloud or on an external service 530 deployed on one or more of a particular enterprise's or user's premises.

In various embodiments, functionality for implementing the techniques of the present invention can be distributed among any number of client and/or server components. For example, various software modules can be implemented for performing various functions in connection with the present invention, and such modules can be variously implemented to run on server and/or client components.

Conceptual Architecture

FIG. 1 is an illustration of a computer-telephony integration (CTI) system in accordance with one embodiment of the invention. A customer 10 makes a call 60 to a contact center 25. Contact center 25 may be part of a plurality of contact centers operated by an enterprise. However, in many cases contact center 25 will have its own geographic telephone number, in order to emphasize proximity to customer 10.

Call 60 is intercepted within telephone network 101 by CTI server 80 based on the dialed number. The calling number (CLI/ANI) is generally presented to CTI server 80 by the network. In some embodiments, an interactive voice response (IVR) unit 95 is also provided. CTI server 80 may use IVR 95 to obtain the CLI (if this is not presented by the network), and/or to obtain additional information from caller 10, for example an account number or other identifying or supplemental demographic information.

CTI server 80 can answer call 60 (either directly or indirectly or with the IVR 95) and play an announcement to caller 10. This announcement can be generic across an enterprise in order to ensure branding consistency, but may also be customizable according to the requirements of a particular establishment associated with an enterprise to which a call is directed. For example, there may be a enterprise-wide promotion for orders above a certain value. All callers may be played a relevant marketing message about this promotion. However, if a management system/customer relationship management (CRM) database 75 at a particular establishment detects that the particular establishment has run out of a promotional item, it can notify CTI server 80, which can then stop playing the marketing message in relation to that promotion to callers for that particular venue. Note that management system and CRM database 75 are shown as one component in FIG. 1 for simplicity, but they may operate as separate components, as will be readily appreciated by one having ordinary skill in the art of contact center architecture.

Information about all incoming calls is stored in call database 70 (and may subsequently be downloaded to management system/CRM database 75 of relevant contact centers). Call database 70 is network-based; in other words, it is located away from customer premised such as contact center 25. In one implementation, call database 70 may be co-located with CTI server 80. Note that call database 70 may be implemented by one or more physical databases as appropriate.

Call database 70 allows CTI server 80 to see if the CLI for a new call matches the CLI for a call recently received. In this case, there may for example be a high likelihood that caller 10 is inquiring about the status of an earlier order. Therefore, CTI server 80 may interrogate management system/CRM database 75 of a relevant enterprise establishment to determine order status. CTI server 80 can then relay relevant information to caller 10, for example, "your order has been dispatched and should be delivered within the next two days". Caller 10 may then be asked if any further service is required. This automated detection of recent callers allows calls that have a high probability of not representing new orders to be handled automatically without involving a human agent.

CTI server 80 may also access information associated with caller 10 from CRM database 75 of a relevant enterprise contact center 25. The information may be accessed based for example on the calling number or perhaps account number of caller 10. If the system does not recognize the calling number, it may use IVR 95 to ask customer 10 if she has previously dealt with enterprise contact center 25. If not, then CRM data might not be available (but may now potentially be first collected at this point). However, if caller 10 is an established customer, caller 10 may be prompted to enter more information to allow the system to locate her CRM data. For example, caller 10 may be asked to enter an alternative phone number, such as a home phone number, if for example caller 10 is calling from her work.

In one embodiment, information in CRM database 75 is processed to provide a customer profile. The customer profile might reflect information such as the overall value of the customer, participation in special promotions etc. CTI server 80 may then use the customer profile (rather than "raw" CRM data) for handling the call. This allows applications running in conjunction with CTI server 80 to avoid accessing and processing all raw CRM data, which may be relatively time-consuming for real-time call handling.

In a preferred embodiment of the invention, a copy of CRM data is uploaded from CRM database 75 to CTI server 80. This upload may be performed on a regular basis, for example daily or weekly; in some cases the CRM upload may not be a fully structured database, but may have a simpler file structure having a standardized data format, such as a spreadsheet (in which case CRM database 75 may be implemented by a spreadsheet file). For example, the spreadsheet may comprise a set of telephone numbers and a customer profile for each telephone number.

Having a copy of the CRM data (in whatever format) local to CTI server 80 provides faster response times for real-time call handling. In general however, CTI server 80 goes across the network to management system/CRM database 75 when checking order information and other relevant information (as described above). This is because order information and other such data are updated frequently at establishment 25 (and so it is more difficult and involves more network traffic to maintain a fully up-to-date copy at CTI server 80).

The customer information (whether a profile or some other form of CRM data) may be used to determine, for example, whether customer 10 is a high value customer based on previous orders. This may lead to a call's 60 being given high priority for being passed through to a live agent, to a call's receiving special offers, or to the call's being directed to a select group of agents who specialize in serving high-value customers. The system may also detect whether caller 10 tends to place the same order multiple times. In such cases, the system might prompt a caller with his standard order, and ask if him if he wants to repeat that order.

Note that CTI server 80 has a much larger capacity for incoming calls than any single establishment 25 generally would. Consequently, callers 10 avoid getting a busy tone, but rather can be entered into a queue located in and controlled by CTI server 80, and played appropriate marketing or informational messages as suggested above (typically by IVR 95). Callers 10 can also be offered incentives to stay in queue—for example, money off if they are queued for more than a certain period (this period might be adjusted in accordance with current queue length, caller status or priority, and overall call volume).

CTI server 80 may also have the capacity to record calls and to collect call statistics. This is attractive to contact centers 25. For example, if a particular establishment reports low sales, an enterprise or franchisor can see whether the low sales are due to a low number of customer contacts or to a poor completion rate for calls. If the latter, the recordings of various calls can be used to investigate the poor completion rate. This information can then help improve the business performance of the relevant enterprise or venue 25 (or to identify any fraud).

Assuming that incoming call 60 is not a repeat call (for example, if no call has been received from that caller within the last hour), CTI server 80 attempts to forward call 60 to a desired contact center 25 (in accordance with the dialed number). If establishment 25 is already busy handling calls, CTI server 80 may queue the call 60. Another possibility is to overflow call 60 to a separate remote call handling facility 130 (that is, different from contact center 25), which may be operated by the same enterprise as center 25, or by an outsourcer or a partner of the enterprise operating center 25. Such an overflow operation may be performed immediately, or only after customer 10 has been held in a queue for a certain time period (which may be dependent upon a relevant customer profile—e.g. high priority customers might be overflowed more promptly).

In one embodiment, call handling facility 130 comprises a remote call center 130, which may serve multiple enterprises, thereby helping to smooth out variations in call rates for individual enterprises, on a statistical basis. Such a call center 130 may also serve businesses of types other than that of contact center 25 (for instance, sales calls for one enterprise and service calls for another might both be handled by remote contact center 130). This allows most efficient use of telephone operatives (also known as, for example, contact center agents, or customer service representatives). A further possibility is to overflow calls to other employees of a receiving enterprise, for example administrative employees who are at home or who may be located at non-contact center locations of an enterprise, such as branch offices or administrative offices. These employees may be paid on a stand-by basis as home-workers to provide an overflow capacity. Note that in some cases, an enterprise may outsource some or all incoming calls to a remote call center 130 (rather than having any staff in contact center 25 for this role). This then allows the staff at contact center 25 to concentrate on appropriate business activities as required.

In one embodiment, CTI server 80 detects if a customer 10 abandons a call before being connected with an agent. CTI server 80 may then select to call customer 10 back directly (based on the CLI) and connect the customer 10 immediately to a live agent.

In general CTI server 80 sets up a separate call to an agent who is to handle call 60 (whether at contact center 25, at remote contact center 130, or elsewhere). This call is then bridged with the original incoming call 60 from customer 10 to allow customer 10 to talk to the agent. Note that since CTI server 80 is still involved in call 60 (rather than linking customer 10 directly to the agent and then dropping out altogether), CTI server 80 can collect call statistics, perform call recording, etc. during the life of the call and of any follow up after call work.

When CTI server 80 forwards a call 60 to an agent, it may also provide information associated with call 60 to a workstation screen associated with the agent (e.g. work station 122 for a call to telephone 121 or to workstation 132 for a call to telephone 131). Note that this may occur even if call 60 is being directed to a homeworker (provided that the homeworker has the facility for separate incoming voice and data, such as broadband or some other suitable Internet connection).

The information provided to the agent receiving call 60 can lead to better and quicker handling of call 60. For example, based on the CLI information, the customer delivery address may be retrieved from a customer database 75. The agent then only needs to confirm the address with caller 10 (rather than having to enter a new address). The agent may also be presented with other information about caller 10 from the CRM database 75, such as that customer 10 should have priority treatment for being a regular and/or high value customer, etc.

The agent may also provide a caller 10 with customer specific offers (as prompted by the application running on CTI server 80). These may be based on customer information stored in CRM database 75. For example, if a particular customer always orders medium size pizzas, she may be offered a special trial deal to upgrade to a larger size. Another possibility is that the offer depends on an overall call experience of caller 10. For example, if the system indicates that caller 10 has been queuing for several minutes, the agent might be prompted to offer the customer 10 free garlic bread as compensation for this delay.

After the agent takes an order, this may be entered via user workstation 122, 132 into management system or CRM database 75. This may be used by call center 25 to manage and track orders. Information from management system or CRM database 75 can also be provided to agents handling calls, for example in relation to current queue times. Another possibility is to notify agents if certain products (e.g. pizza toppings) run out, so that customers 10 can be offered a suitable alternative.

In a preferred embodiment, CTI server 80 and associated databases are multi-tenanted, in that the same hardware is shared by multiple different organizations (such as different pizza establishments 25). Each establishment 25 has access to its own data regarding call statistics and so on. A managing entity (e.g. a franchisor or head office for a group of outlets) may be provided with access to aggregate data for all the different tenants. It will be appreciated that this collective approach allows the cost of more advanced facilities (such as call recording and/or voice recognition) to be shared across a number of establishments.

Figure 2:
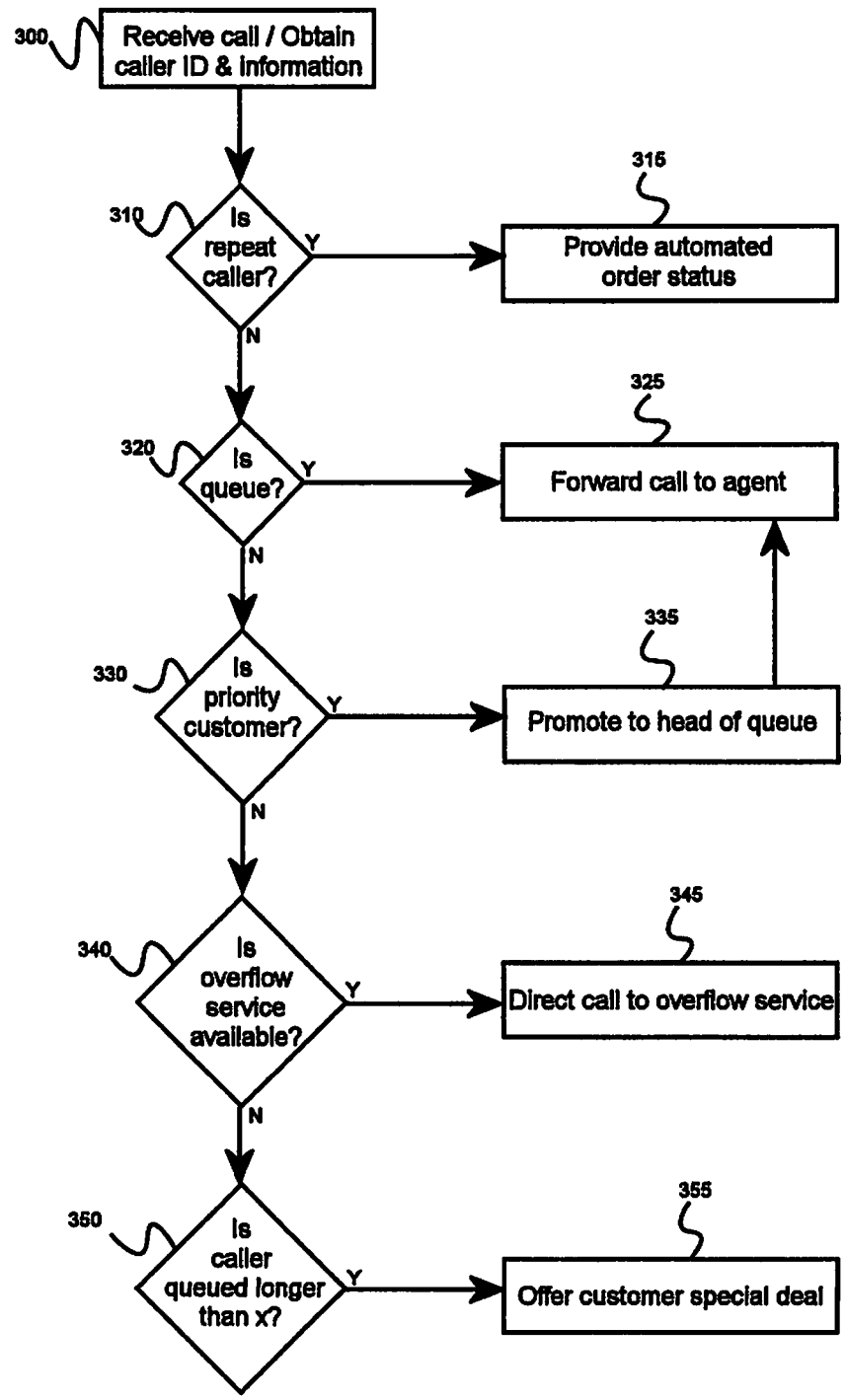
FIG. 2 is a schematic flowchart of call handling for a pizza delivery service in accordance with one embodiment of the invention.

FIG. 2 illustrates a method for handling a call 60 in accordance with a preferred embodiment of the invention such as described above. This method may be implemented using a computer telephony system shown in FIG. 1 or any other appropriate system. It will be appreciated that many variations are possible of the methodology of FIG. 2.

The method commences in step 300 with receiving an incoming call 60 from a caller 10 and obtaining caller identification. Caller identification may, for example, comprise a calling line identifier (CLI), also known as automatic number identification (ANI). Another possibility is that an IVR system 95 is used to obtain information identifying a caller 10, such as an account number.

Caller identification information can be used to access information about a specific caller 10. For example, in step 310 a check may be made to determine if caller 10 is a repeat caller; if so, then in step 315 he/she may be played automated information about the status of their current order. In addition, an account number or a telephone number may be used to identify a customer record in a customer relationship management database. Once the appropriate customer record has been identified, the system can now retrieve information (e.g. a profile) from this record for the particular customer 10 making the call 60.

The system now determines how to act based on the caller information. One possibility is that caller 10 may be played a message comprising marketing information of specific relevance to the specific caller 10 (not shown in FIG. 2). For example, the marketing message may indicate that a product that the customer 10 has previously purchased is currently on special offer. The CRM information may also be used to identify priority customers 10 who can then be routed to the head of a call handling queue.

In step 320, if caller 10 is still in a queue, then in step 325 the call could be forwarded to an agent, or if a check in step 340 confirms that an overflow service is available, then in step 345 caller 10 may be routed to an overflow call handling facility (e.g. a call center, and/or homeworkers).

In some implementations, the information provided onto screen 122 of an agent 120 who eventually receives call 60 may include an indication or details of any caller-specific marketing message played to caller 10. For example, if caller 10 has been played a marketing message about a particular promotion, CTI server 80 may prompt (script) the agent to ask the caller 10 if she is interested in pursuing the offer that she has just heard. Another possibility is that the agent is provided with data indicating which caller-specific marketing message was played to a caller 10, so that the agent will be aware of the situation in case the caller 10 asks about a product or service described in the marketing message. If the caller 10 is further delayed in a queue, the agent may be instructed to provide the caller 10 with some special offer as compensation.

Similarly, in step 330 a check may be made to determine if caller 10 is a priority customer, and if so, then in step 335 caller 10's call may be promoted to the head of a queue (and when an agent becomes available, the call may be delivered to the agent in step 325). Similarly, as mentioned before, if a caller 10 has been queued longer than a configured amount of time (checked in step 350), then in step 355 a special deal or promotion may be provided to caller 10 as compensation for the longer-than-desired wait time.

It can be seen therefore that call handling can be based on customer data (e.g., a customer profile), and/or on call data (e.g., whether the caller has recently called or has been in a queue for a long time).

Figure 6:
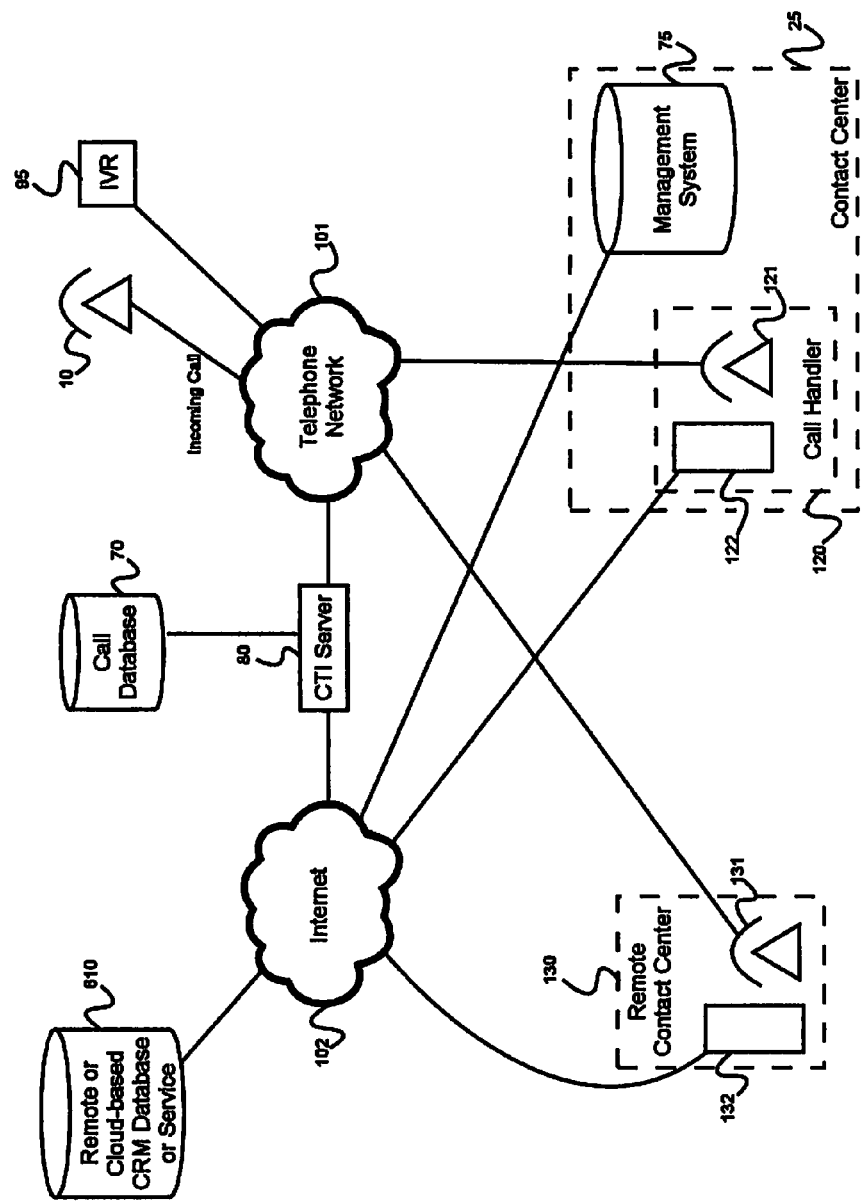
FIG. 6 is a schematic diagram of a CTI system comprising cloud-based CRM services, in accordance with one embodiment of the invention.

FIG. 6 is an illustration of a computer-telephony integration (CTI) system in accordance with one embodiment of the invention, comprising a cloud-based CRM database or service 610. As in the embodiment illustrated in FIGS. 1 and 2, cloud-based CRM database or service 610 is located remotely from call handling center 25 According to the embodiment, customer information may be stored in a cloud-based or remote CRM database 610 for retrieval on demand, such as when a call is received. Such information may, as previously described, be used to create a customer profile for determination of customer value, previous behavior or trends, or to customize services or offers such as promotional deals based on a specific customer's history.

A remote CRM database 610 may be a simple remote database used to store customer information for access by a number of (continuing from the previous examples) pizza franchises, or it may be a cloud-hosted CRM service such as that provided by salesforce.com or similar companies. Such services may have their own CRM processing to improve efficiency and service for clients (in this case, a pizza delivery service), which may add value to a client's service and improve business through improved customer service and more efficient internal handling of information.

Such a service does not need to be the sole source of customer information, and may instead be used as a source of updates to be incorporated to a locally-maintained CRM database. These updates may be retrieved automatically when data is accessed ("pull" functionality), or may be automatically sent from the cloud to a local database when data is changed remotely ("push" functionality), or may be setup in any of a variety of manual or scheduled update schemes as may be desirable. Such an approach incorporating both local- and cloud-based CRM solutions may have an increased benefit to a business, combining the storage and processing functionality of a cloud-based service with the reliability of maintaining a local copy should the connection to the cloud-based database be interrupted for whatever reason, and may improve efficiency by allowing remote processing while a local database is used to serve customer information as needed, distributing a workload between multiple systems to improve the speed and efficiency of any single system during practice.

Figure 7:
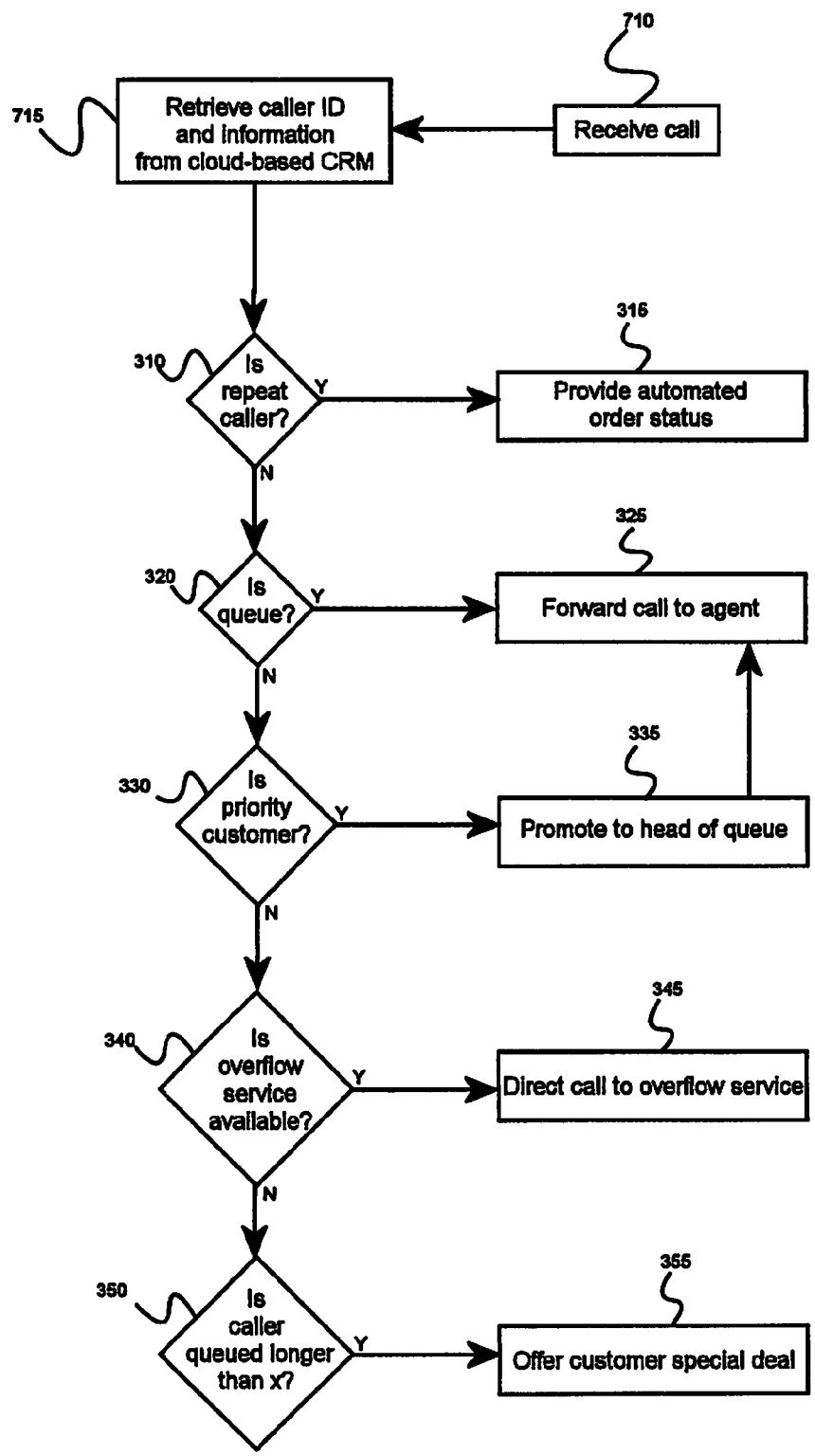
FIG. 7 is a schematic flowchart of call handling for a pizza delivery service utilizing a cloud-based CRM service, in accordance with one embodiment of the invention.

FIG. 7 illustrates a method for handling a call 60 in accordance with a preferred embodiment of the invention such as described above, incorporating a cloud-based CRM database or service 610. This method may be implemented using a computer telephony system shown in FIG. 6 or any other appropriate system. It will be appreciated that many variations are possible of the methodology of FIG. 7.

The method commences in step 710 with receiving an incoming call 60 from a caller 10 and obtaining caller identification. Caller identification may, for example, comprise a calling line identifier (CLI), also known as automatic number identification (ANI). Another possibility is that an IVR system 95 is used to obtain information identifying a caller 10, such as an account number, order number or support case identifier.

Caller identification information is then (in step 715) retrieved from a remote CRM database or service 610, which may (in the case of a cloud-based service such as that provide by salesforce.com or similar providers) provide additional information for handling of a customer based on analysis of the customer's information and interaction history, for example (continuing with the example of a pizza delivery service) a customer who consistently orders according to currently running promotions or coupons might be indicated for a promotional deal that might not be offered to customers with different behavior patterns or history. Such additional information would add value to the service being provided and improve a customer's perception of a business, giving more tailored or personalized service based on an individual customer's information rather than a "one size fits all" approach where the service is the same for all customers, which may make an individual customer feel unappreciated or undervalued by a business because their unique behavior or needs are not being recognized. The remainder of the method illustrated in FIG. 7 proceeds as described above with reference to FIG. 2.

The system described above may also have some or all of the following functionality:

CLI capture—if CLI is not presented, call 60 is intercepted and caller 10 is asked to input his telephone number. Likewise, if the CLI is not recognized, the caller 10 may be asked to input an alternative telephone number (e.g. a home number if he is calling from work or from a mobile device). The entered number is then provided as CLI when call 60 is transferred to a contact center 25. This allows near 100% screen popping plus other relevant functionality.

VIP caller treatment—VIP callers recognized by their CLI are placed at the front of a queue, ensuring a superb customer service for the most loyal customers.

No busy tone—usually a shop can only take as many calls as they have inbound telephone channels. Thus if they have 5 channels, the 6th caller gets a busy tone. The present system queues callers in the network so they do not receive a busy tone.

Queue positions and expected wait times can be announced to callers.

Automated callback can be provided, such that if a caller hangs up while in a queue (and CLI is available), the system calls the caller 10 back immediately for connection to the first live agent.

The system operates as a virtual call center providing (a) call statistics such as abandon rates, time to abandon, etc., and (b) call overflow, e.g. to homeworkers with a broadband connection.

Call recording allows the best practice of best perforating order takers to be analyzed and spread, and protects against fraud.

The system provides automated status updates for a caller who has recently placed an order, so that they are given an order status update with the option to hold for the shop.

Average order value can be increased using relevant marketing, e.g. enabling shops to make specific offers to individual customers, based on a) individual customer history (e.g. upsell to large for callers who normally only buy medium), b) customer profile (e.g. market new vegetarian option to vegetarians), c) external information (e.g. market ice cream if weather is hot), d) pizza shop details (e.g. don't promote side salads if these are currently out of stock), e) special offer for callers who have been queued for a long time—(or combination of any of above).

Consistent branding and standard offers.

The skilled person will be aware of a range of possible modifications of the various embodiments described above—e.g. the techniques described may be applied to other fast food outlets than pizzas, and other customer services, not just fast food delivery. For example, the techniques described may be applied to tire and/or exhaust fitting businesses, and to a wide range of other commercial, retail and service offerings. Accordingly, the present invention is defined by the claims and their equivalents.

What is claimed is:

1. A method of handling a telephone call within a telephone network, the method comprising the steps of:
    (a) providing a multi-tenanted computer-telephony integration (CTI) server located within a telecommunications network and adapted to receive telephone calls via a telephony interface on behalf of a plurality of contact centers located on premises of a plurality of enterprises, the CTI server located outside the premises of the various enterprises;
    (b) receiving a telephone call to one of the outlets at the telephony interface of the CTI server;
    (c) using an indicia received with or at the same time as the received call to identify a calling party and to retrieve a profile of the calling party from a cloud-based customer relationship management (CRM) system located remotely from the CTI server and from the plurality of contact centers by matching the indicia to a previously-stored indicia in a call history database collocated with the CTI server, wherein the profile comprises at least a plurality of previous orders processed by one or more of the outlets on behalf of the calling party;
    (d) if no agent is available to immediately receive the telephone call, queuing the call at the CTI server; and
    (e) when an agent becomes available, forwarding the call from the CTI server to a telephony device used by an available agent;
    wherein the CTI server uses the profile for providing priority call handling for high value callers, wherein a caller is determined to be high value based at least on an attribute obtained from the profile of the caller.

2. The method of claim 1, wherein the profile is used to provide a targeted marketing message to the calling party.

3. The method of claim 2, wherein the marketing message is based on current availability of a product or service from an enterprise.

4. The method of claim 3, wherein the marketing message is based at least in part on the time spent by the calling party in queue.

5. A system for handling a telephone call within a telephone network, comprising:
- a multi-tenanted computer-telephony integration (CTI) server located within a telecommunications network and adapted to receive telephone calls via a telephony interface on behalf of a plurality of contact centers located on premises of a plurality of enterprises, the CTI server located outside the premises of the plurality of enterprises;
- wherein the CTI server is further adapted for queuing an incoming call in the telecommunications network when no agent is available to receive the call;
- wherein the CTI server is further adapted to forward the incoming call to an agent when the agent becomes available;
- wherein the CTI server is configured to use an indicia received with or at the same time as the received call to identify a calling party and to retrieve a profile of the calling party from a cloud-based customer relationship management (CRM) system located remotely from the CTI server and from the plurality of contact centers by matching the indicia to a previously-stored indicia in a call history database collocated with the CTI server, wherein the profile comprises at least a plurality of previous orders processed by one or more of the outlets on behalf of the calling party; and
- wherein the CTI server uses the profile to provide priority call handling for high value callers, wherein a caller is determined to be high value based at least on an attribute obtained from the profile of the caller.

6. The system of claim 5, wherein the call history database is bundled with a customer relationship management service.

7. The system of claim 6, wherein the profile is used to provide a targeted marketing message to the calling party.

8. The system of claim 7, wherein the marketing message is based on current availability of a product or service from an outlet.

9. The system of claim 8, wherein the marketing message is based at least in part on the time spent by the calling party in queue.

* * * * *